US010482677B1

(12) United States Patent
Iyer et al.

(10) Patent No.: US 10,482,677 B1
(45) Date of Patent: Nov. 19, 2019

(54) DISTRIBUTED SIMULTANEOUS LOCALIZATION AND MAPPING (SLAM) IN VIRTUAL, AUGMENTED, AND MIXED REALITY (XR) APPLICATIONS

(71) Applicant: Dell Products, L.P., Round Rock, TX (US)

(72) Inventors: Vivek Viswanathan Iyer, Austin, TX (US); Michael S. Gatson, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/197,064

(22) Filed: Nov. 20, 2018

(51) Int. Cl.
| | |
|---|---|
| G06T 19/00 | (2011.01) |
| G06T 15/20 | (2011.01) |
| G02B 27/01 | (2006.01) |
| G06F 17/16 | (2006.01) |
| G06K 9/32 | (2006.01) |
| G06F 3/01 | (2006.01) |

(52) U.S. Cl.
CPC ........ G06T 19/006 (2013.01); G02B 27/0172 (2013.01); G06F 3/012 (2013.01); G06F 17/16 (2013.01); G06K 9/3241 (2013.01); G06T 15/20 (2013.01); G06T 2219/024 (2013.01)

(58) Field of Classification Search
CPC . G06T 15/20; G06T 19/006; G06T 2219/024; G02B 27/0172; G06K 9/3241; G06F 3/012; G06F 17/16
See application file for complete search history.

(56) References Cited

U.S. PATENT DOCUMENTS

| | | | | |
|---|---|---|---|---|
| 8,296,434 | B1* | 10/2012 | Miller | H04L 67/1029 709/226 |
| 2011/0320123 | A1* | 12/2011 | Choi | G01S 5/0284 701/300 |
| 2012/0230550 | A1* | 9/2012 | Kraut | G05D 1/024 382/113 |

(Continued)

OTHER PUBLICATIONS

Riisgaard, et al., "SLAM for Dummies," 127 pages, available at https://ocw.mit.edu/courses/aeronautics-and-astronautics/16-412j-cognitive-robotics-spring-2005/projects/1aslam_blas_repo.pdf.

(Continued)

*Primary Examiner* — Ke Xiao
*Assistant Examiner* — Jed-Justin Imperial
(74) *Attorney, Agent, or Firm* — Fogarty LLP

(57) ABSTRACT

Embodiments of systems and methods for distributed Simultaneous Localization and Mapping (SLAM) in virtual, augmented, and mixed reality (xR) applications are described. An Information Handling System (IHS) may include a processor and a memory coupled to the processor, the memory having program instructions that, upon execution by the processor, cause the IHS to: receive first SLAM data obtained by a first HMD worn by a first user during execution of an xR application; receive second SLAM data obtained by a second HMD worn by a second user co-located with the first user; apply a transform matrix to the second SLAM data to produce transformed second SLAM data in a common coordinate system with respect to the first SLAM data; and render at least a partial map for display by the first HMD using a combination of landmarks identified in the first SLAM data and in the transformed second SLAM data.

17 Claims, 7 Drawing Sheets

(56) References Cited

U.S. PATENT DOCUMENTS

| | | | | |
|---|---|---|---|---|
| 2014/0156164 A1* | 6/2014 | Schuberth | ............ | B60W 30/143 701/96 |
| 2014/0267234 A1* | 9/2014 | Hook | ....................... | H04W 4/02 345/419 |
| 2015/0334631 A1* | 11/2015 | Patil | ....................... | H04W 40/28 380/270 |
| 2016/0317122 A1* | 11/2016 | dos Santos Mendonca | ................. | A61B 8/467 |
| 2017/0330387 A1* | 11/2017 | Dearman | ................. | G06F 3/011 |

OTHER PUBLICATIONS

Joan Sola, "Simulataneous localization and mapping with the extended Kalman filter," Oct. 5, 2014, 35 pages, available at http://www.iri.upc.edu/people/jsola/JoanSola/objectes/curs_SLAM/SLAM2D/SLAM%20course.pdf.

Zia, et al., "Comparative Design Space Exploration of Dense and Semi-Dense SLAM," Mar. 3, 2016, 9 pages, available at https://arxiv.org/pdf/1509.04648.pdf.

Tang, et al., "Embedded Systems Architecture for SLAM Applications," 4 pages, available at https://arxiv.org/ftp/arxiv/papers/1702/1702.01295.pdf.

Occipital, The Spatial Computing Company, Occipital Inside-out tracking, 6 pages, available at http://www.occipital.com (structuredcoremodule).

Egodagamage, et al., "Distributed Monocular SLAM for Indoor Map Building," Journal of Sensors, vol. 2017, Article ID 6842173, Aug. 10, 2017, 11 pages, available at https://www.hindawi.com/journals/js/2017/6842173/.

Nettleton, et al., "Decentralised SLAM with Low-Bandwidth Communication for Teams of Vehicles," Jul. 7, 2006, pp. 179-188, Publisher, Springer, Berlin, Heidelberg, available at https://link.springer.com/chapter/10.1007% 2F10991459_18#citeas.

Robert Collins, "Lecture 12: Camera Projection," 34 pages, available at http://www.cse.psu.edu/~rtc12/CSE486/lecture12.pdf.

* cited by examiner

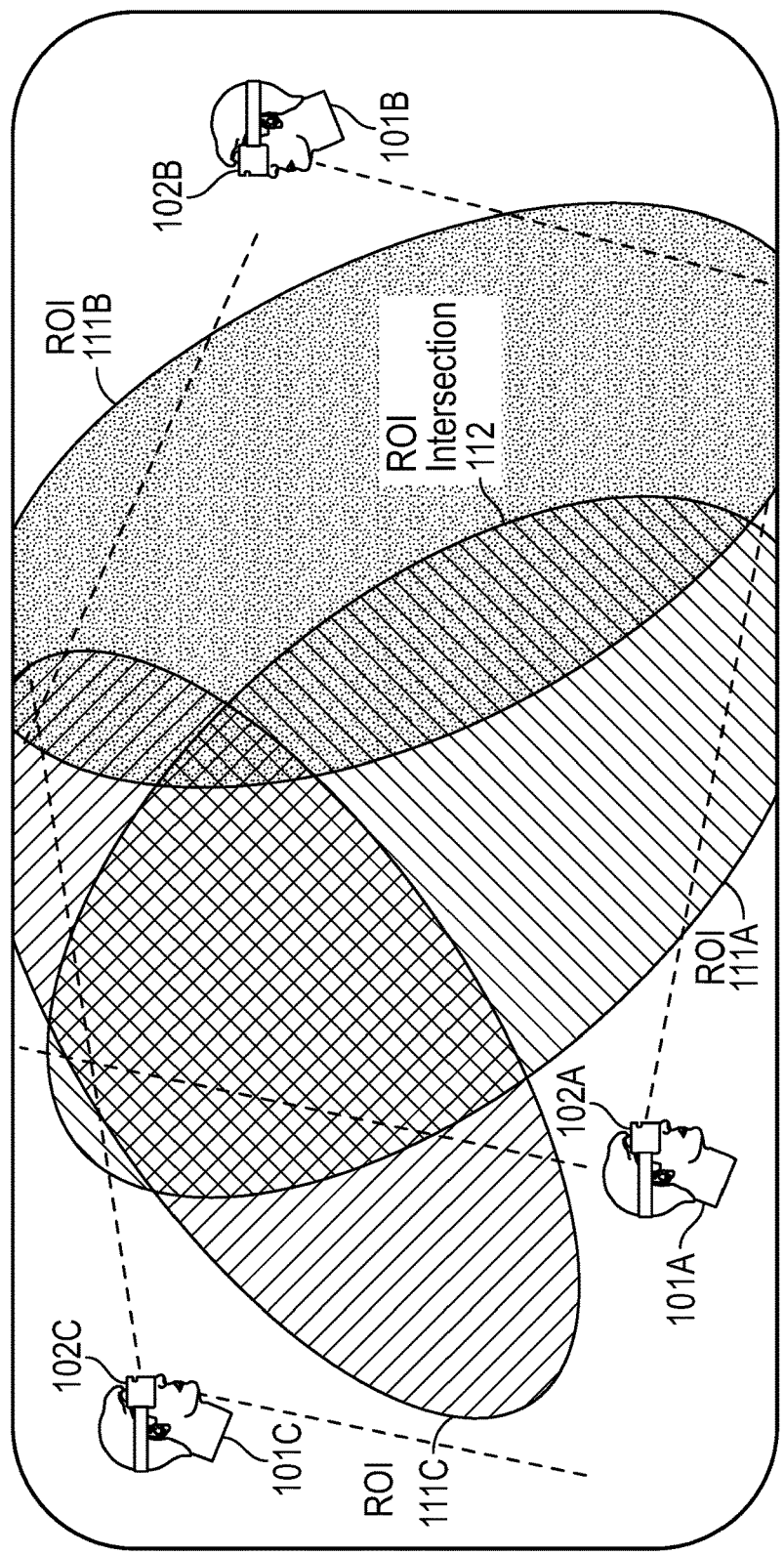

DISTRIBUTED SIMULTANEOUS LOCALIZATION AND MAPPING (SLAM) IN VIRTUAL, AUGMENTED, AND MIXED REALITY (XR) APPLICATIONS

FIELD

The present disclosure generally relates to Information Handling Systems (IHSs), and, more particularly, to systems and methods for distributed Simultaneous Localization and Mapping (SLAM) in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for distributed Simultaneous Localization and Mapping (SLAM) in virtual, augmented, and mixed reality (xR) applications are described. In an illustrative, non-limiting embodiment, an Information Handling System (IHS) may include a processor; and a memory coupled to the processor, the memory having program instructions stored thereon that, upon execution by the processor, cause the IHS to: receive first SLAM data obtained by a first Head-Mounted Device (HMD) worn by a first user during execution of an xR application; receive second SLAM data obtained by a second HMD worn by a second user co-located with the first user; apply a transform matrix to the second SLAM data to produce transformed second SLAM data in a common coordinate system with respect to the first SLAM data; and render at least a partial map for display by the first HMD using a combination of landmarks identified in the first SLAM data and in the transformed second SLAM data.

For example, a first SLAM data may include landmark data found in a Region of Interest (ROI) within an infrared (IR) or near-IR (NIR) frame captured via a first camera mounted on the first HMD, and the second SLAM data may include landmark data found in another ROI within another IR or NIR frame captured via a second camera mounted on the second HMD.

The program instructions, upon execution, may cause the IHS to, in response to determining that the processor's utilization is above a threshold level, reduce an amount of second SLAM data relative to an amount of first SLAM data processed. For example, reducing the second amount of SLAM data may include reducing a size of an ROI, per frame, received from the second HMD. Additionally, or alternatively, reducing the second amount of SLAM data may include reducing a number of frames, per unit time, received from the second HMD. Moreover, using the combination of landmarks further may include resolving two or more landmarks that overlap in space between a first ROI in the first SLAM data and a second ROI in the transformed second SLAM data.

The program instructions, upon execution, may cause the IHS to select the second HMD among a plurality of other HMDs as being closest in space to the first HMD, at the given location. The program instructions, upon execution, may also cause the IHS to select the second HMD among a plurality of other HMDs as being closest the first HMD's predicted trajectory.

The program instructions may cause the IHS to request that another IHS coupled to the IHS: receive at least a portion of the first SLAM data; apply a transform matrix to the first SLAM data to produce transformed first SLAM data in a common coordinate system with respect to the second SLAM data; and render at least another partial map for display by the second HMD using a combination of landmarks identified in the first transformed SLAM data and in the second SLAM data. The program instructions may also cause the IHS to send the request to the second IHS in response to a determination that the processor's utilization is above a threshold level.

Additionally, or alternatively, the program instructions may cause the IHS to send the request to the second IHS in response to a determination that the second IHS has joined a mesh network. The second HMD may be in direct communications with the second IHS and not with the first IHS, and the first IHS may be in direct communications with the second IHS.

In another illustrative, non-limiting embodiment, a method may include: receiving, at an IHS coupled to an HMD worn by a first user during execution of an xR application, first SLAM data obtained via a first camera mounted on the first HMD; receiving second SLAM data obtained by a second HMD worn by a second user co-located with the first user; applying a transform matrix to the second SLAM data to produce transformed second SLAM data in a common coordinate system with respect to the first SLAM data; and rendering at least a partial map for display by the first HMD using a combination of landmarks identified in the first SLAM data and in the transformed second SLAM data.

The first SLAM data may include landmarks found within a first Region of Interest (ROI) observable by the first user, and the second SLAM data may include other landmarks found within a second ROI observable by another user. The method may also include resolving two or more landmarks that overlap in space between the first ROI and the second ROI. For example, resolving the two or more landmarks may include comparing Kalman Gains of each of the two or more landmarks separated by a threshold distance, and selecting a landmark with highest Kalman Gain. The method may further include determining that the IHS's utilization is above a threshold level; and reducing an amount of first SLAM data relative to an amount of second SLAM data processed in response to the determination.

In yet another illustrative, non-limiting embodiment, a hardware memory of an HMD wearable by a user during execution of an xR application may have program instructions stored thereon that, upon execution by a processor, cause the HMD to: collect first SLAM data; transmit the first SLAM data to an Information Handling System (IHS) coupled to the HMD; and display a rendering received from IHS, wherein the rendering is created, at least in part, using a combination of landmarks identified in the first SLAM data and in second SLAM data obtained by the IHS from a second HMD. The second HMD may be in direct communication with the first IHS. The second HMD may be in direct communications with a second IHS and not with the first IHS, and the second IHS may be in direct communication with the first IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIGS. 1A-C illustrate an example of an environment where a virtual, augmented, or mixed reality (xR) application may be executed, according to some embodiments.

DETAILED DESCRIPTION

To facilitate explanation of the various systems and methods discussed herein, the following description has been split into sections. It should be noted, however, that any sections, headings, and subheadings used herein are for organizational purposes only, and are not meant to limit or otherwise modify the scope of the description nor the claims.

Overview

Embodiments described herein provide systems and methods for distributed Simultaneous Localization and Mapping (SLAM) in virtual, augmented, and mixed reality (xR) applications. These techniques are particularly useful in xR applications that employ Head-Mounted Devices (HMDs), Heads-Up Displays (HUDs), and eyeglasses—collectively referred to as "HMDs."

Figure 1A:
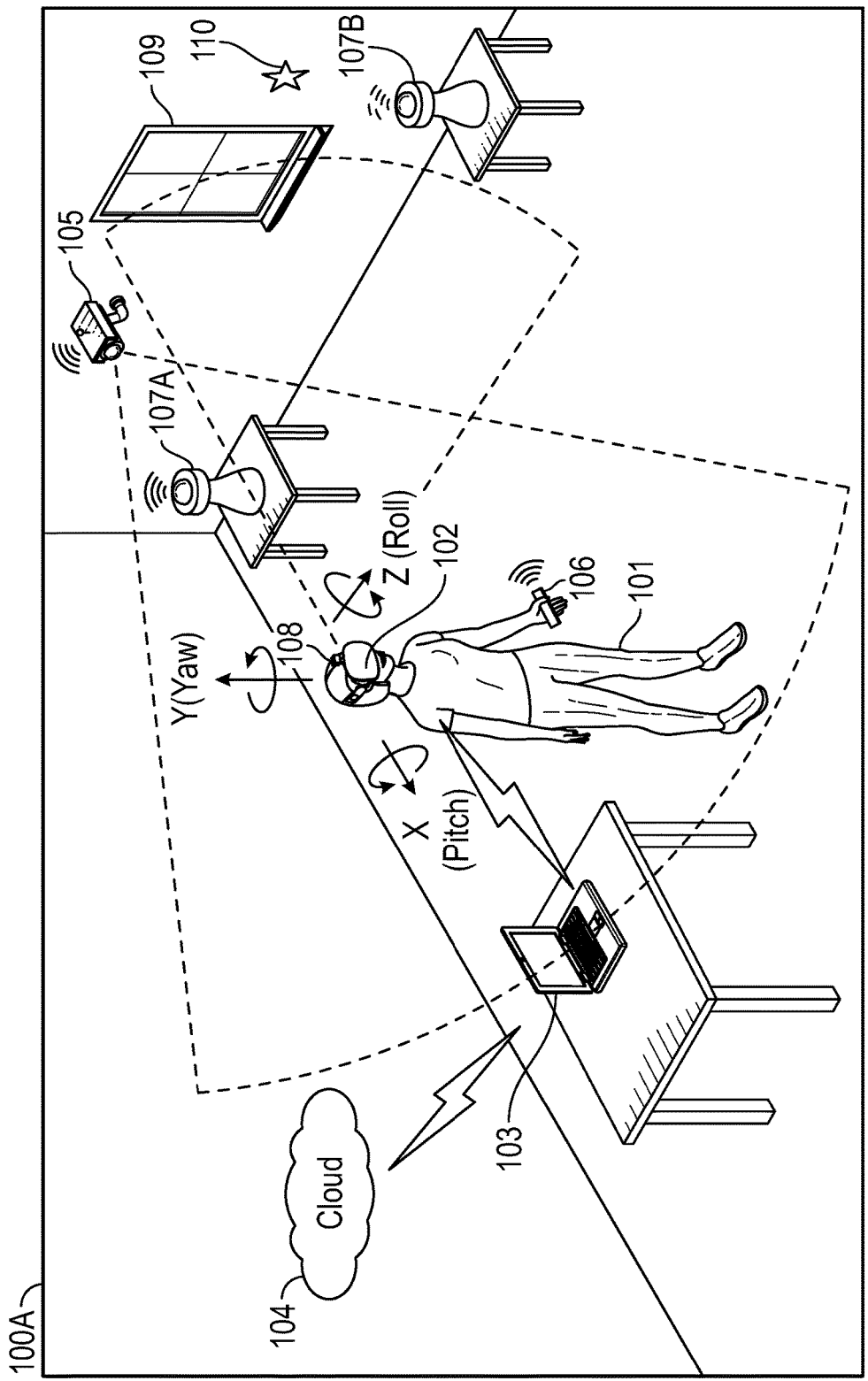

FIG. 1A is a perspective view of environment 100A where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In environment 100A, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective.

As user 101 moves about environment 100A, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment among a plurality of users. For example, each user may wear their own HMD tethered to a different host IHS, such as in the form of a video game or a productivity application (e.g., a virtual meeting).

FIG. 1B shows a co-located multi-user xR implementation with three participants 101A-C, each participant wearing their own HMD 102A-C. In some cases, each of HMDs 102A-C may be tethered to its own dedicated IHS 103A-C. Alternatively, a first number M of HMDs and a second number N of IHSs may be used (e.g., one IHS "server" for two HMD "clients," etc.). In this example, it is assumed that each of the IHSs may have different compute capabilities; and that all HMDs are using inside-out Extended Kalman Filtering (EKF) SLAM tracking, with wide mapping field of view up to 360 degrees (e.g., with surround sensors and/or cameras).

As such, each HMD 102A-C may include an instance of inside-out camera 108 configured to capture IR/NIR frames, and therefore sends those frames and associated data (SLAM data) to its respective IHS 103A-C. Then, each IHS 103A-C determines one or more Regions-of-Interest (ROIs) 111A-C within the HMD 102A-C's respectively captured frames and/or field-of-view (FOV), and performs one or more SLAM operations upon the SLAM data obtained for each ROI. Depending upon the position and pose of each HMD, ROI intersection area 112 may occur, such that redundant or duplicate calculations are performed by HMDs 102A-C for landmarks found in each intersection.

Figure 1C:
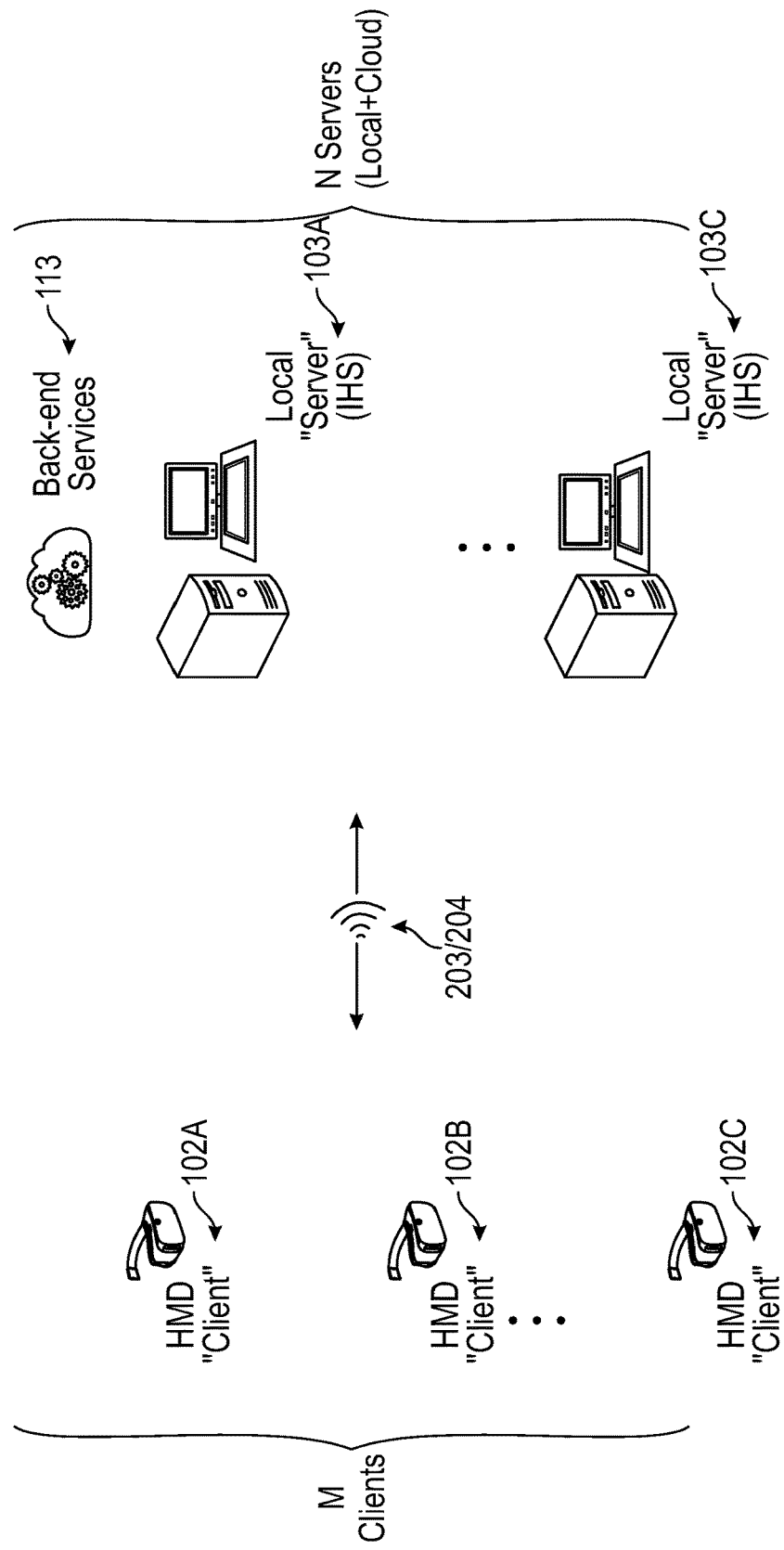

FIG. 1C shows N IHS server nodes 103A-N connected wired/wirelessly in a mesh ad-hoc network architecture to M HMD client nodes 102A-N. In some architectures, one of IHS nodes 103A-C (e.g., the first node to start the xR collaboration session) may be responsible for session control actions, but otherwise the network may remain without a central server. Additionally, or alternatively, a remote cloud or backend IHS 113 may enable other IHSs 103A-C to offload xR processing and/or additional operations to it, for example, via the Internet.

In the aforementioned use-case, it may become important to optimize the performance of SLAM operations (e.g., compute, accuracy) executed by the various IHSs and HMDs. Additionally, it may become important to have a scalability compute mechanism for the N:M architecture, to operate in cohesion, optimize compute, and speed up mapping (localization and tracking map updates), while improving accuracy and maintaining low latency of updates.

Figure 2:
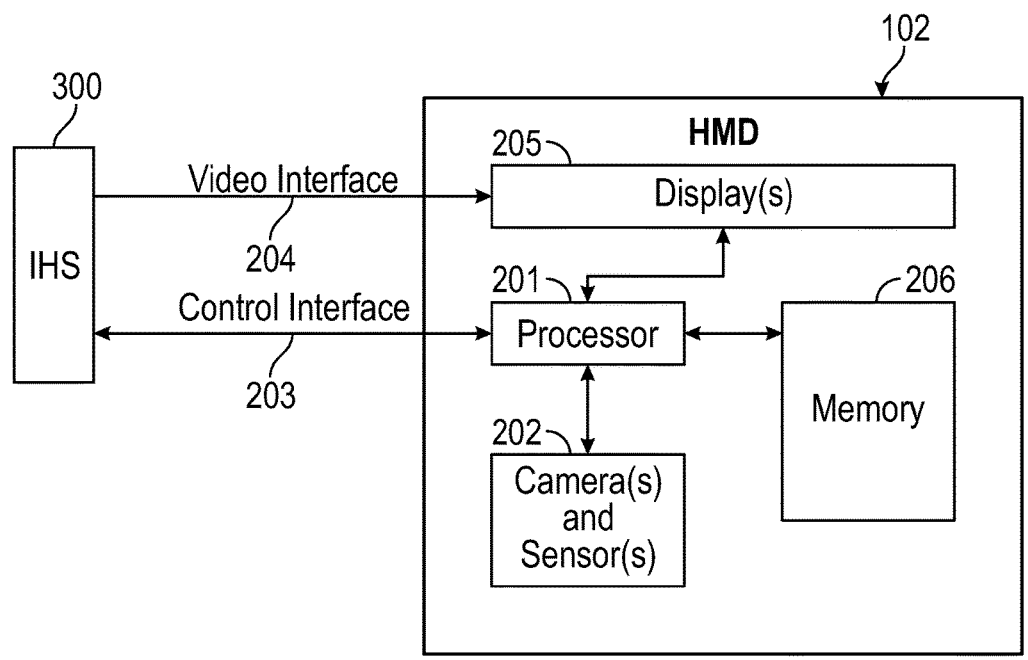
FIG. 2 illustrates an example of electronic components of a Head-Mounted Display (HMD), according to some embodiments.

FIG. 2 illustrates an example of electronic components of HMD 102. In various embodiments, HMD 102 may include number of camera(s) and/or sensor(s) 202 coupled to processor or controller 201, according to some embodiments. Examples of camera(s) 202 include, but are not limited to: inside-out cameras, outside-in cameras, eye tracking cameras, RGB cameras, gesture cameras, infrared (IR) or near-IR (NIR) cameras, SLAM cameras, etc. Meanwhile, examples of sensor(s) 202 include, but are not limited to: electric, magnetic, radio, optical, infrared, thermal, force, pressure, acoustic, ultrasonic, proximity, position, deformation, movement, velocity, rotation, gyroscopic, and/or acceleration sensor(s). In some cases, camera(s) and/or sensor(s) 202 may be coupled to processor or controller 201 via a sensor hub.

Processor or controller 201 of HMD 102 is also coupled to IHS 300 (FIG. 3) via a wired (e.g., USB) or wireless connection (e.g., Wi-Fi, Bluetooth, etc.), thus establishing control interface 203. Control interface 203 may provide forward and backward communication channels between processor 201 and IHS 300, depending upon the architecture of the xR system, to facilitate execution of an xR application. For example, program instructions stored in memory 206, when executed by processor 201, may cause frames captured by camera(s) 202 to be transmitted to IHS 300 via control interface 203.

IHS 300 may in turn execute distributed SLAM module 403 (FIG. 4), for example, based upon landmarks found in the video frames received from HMD 102's camera(s) 108 (or from outside-in camera 105). Particularly, distributed SLAM module 403 may be configured to implement tracking techniques that use distinctive visual characteristics of the physical environment to identify specific images or shapes which are then usable to calculate HMD 102's position and orientation. Then, rendering engine 406 (FIG. 4) may use data from distributed SLAM module 403 to render an image to be provided to display(s) 205 via video interface 204 (e.g., High-Definition Multimedia Interface or "HDMI," Digital Visual Interface or "DVI," DISPLAYPORT, etc.).

Video interface 204 may drive both a right and left display 205 (one for each eye), in order to provide a 3-D or stereoscopic view. In some cases, video interface 204 may include two separate video interfaces, one for each display 205. Additionally, or alternatively, a single interface that supports multi-stream may be used to drive both displays 205.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
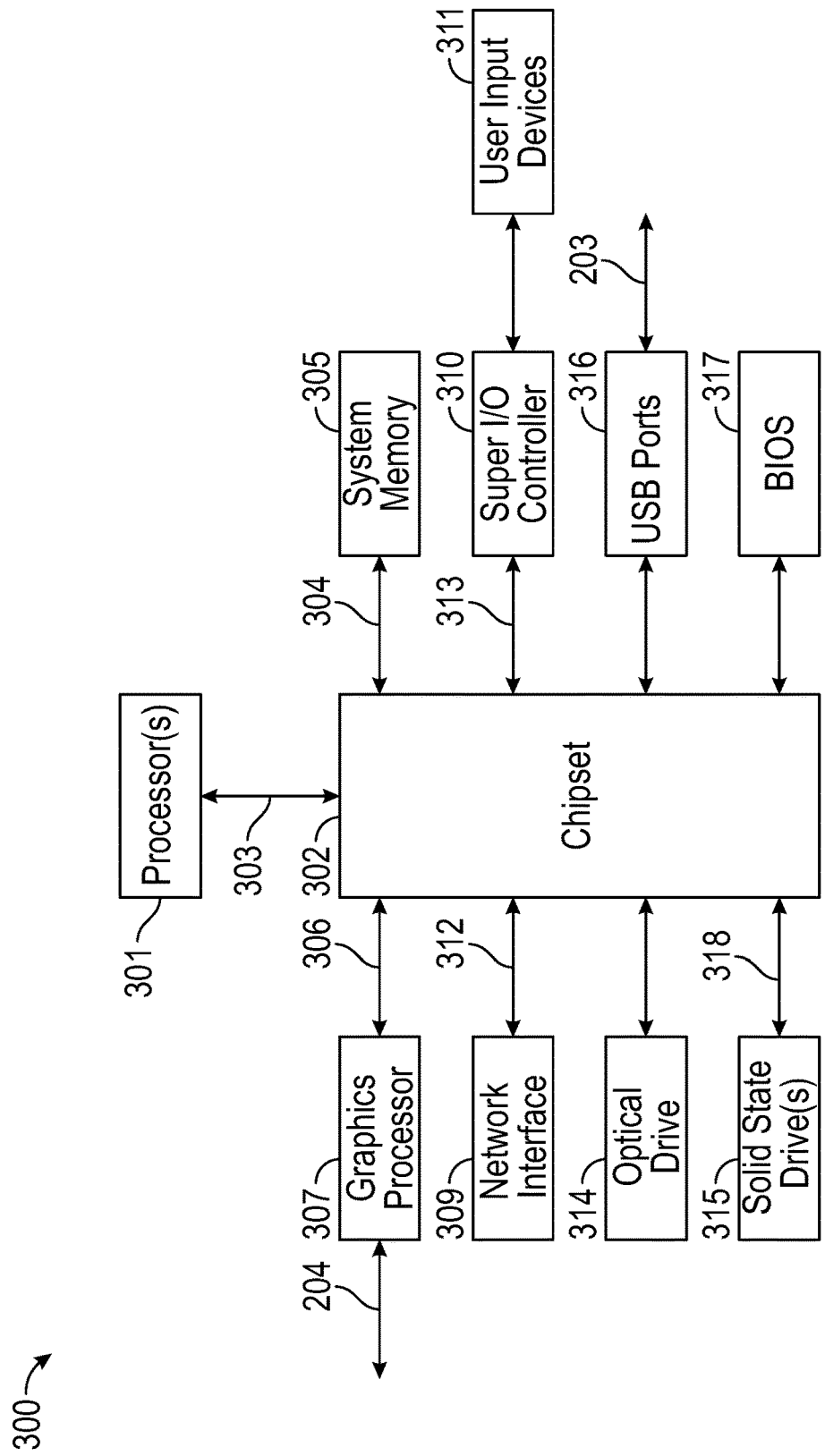
FIG. 3 illustrates an example of electronic components of an Information Handling System (IHS), according to some embodiments.

FIG. 3 is a block diagram of IHS 300 configured to implement host IHS 103, according to certain embodiments. As shown, IHS 300 may include one or more processors 301. In various implementations, IHS 300 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 300 includes chipset 302 that may include one or more integrated circuits that are connect to processor(s) 301. In certain embodiments, chipset 302 may utilize QuickPath Interconnect (QPI) bus 303 for communicating with the processor(s) 301. Chipset 302 provides the processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of IHS 300. Graphics processor 307 may be coupled to the chipset 302 via a graphics bus 306 such as provided by an Accelerated Graphics Port (AGP) bus or a Peripheral Component Interconnect Express (PCIe) bus. In certain embodiments, graphics processor 307 generates display signals and provides them to HMD device 102 via video interface 204.

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to the super I/O controller 310 via a Low Pin-Count (LPC) bus 313.

Other resources may also be coupled to the processor(s) 301 of IHS 300 through the chipset 302. In certain embodiments, chipset 302 may be coupled to a network interface 309, such as provided by a Network Interface Controller (NIC) that is coupled to IHS 300. In certain embodiments, the network interface 309 may be coupled to the chipset 302 via a PCIe bus 312. According to various embodiments, network interface 309 may support communication via various wired and/or wireless networks. In certain embodiments, the chipset 302 may also provide access to one or more Universal Serial Bus (USB) ports 316; which in some implementations may serve as transport for establishing control interface 203 with HMD 102.

Chipset 302 also provides access to one or more solid-state storage devices 315. The chipset 302 utilizes a PCIe bus interface connection 318 in order to communication with the solid-state storage device 315. In certain embodiments, chipset 302 may also provide access to other types of storage devices. For instance, in addition to the solid-state storage device 315, an IHS 300 may also utilize one or more magnetic disk storage devices, or other types of the storage devices such as an optical drive or a removable-media drive. In various embodiments, the solid-state storage device 315 may be integral to IHS 300, or may be located remotely from IHS 300.

Another resource that may be accessed by processor(s) 301 via chipset 302 is a Basic Input/Output System (BIOS) 317. As described in more detail below with respect to additional embodiments, upon powering or restarting IHS 300, processor(s) 301 may utilize BIOS 317 instructions to initialize and test hardware components coupled to IHS 300 and to load an operating system for use by IHS 300. BIOS 317 provides an abstraction layer that allows the operating system to interface with certain hardware components that are utilized by IHS 300. Via this hardware abstraction layer provided by BIOS 317, the software executed by the processor(s) 301 of IHS 300 is able to interface with certain I/O devices that are coupled to IHS 300. As used herein, the term "BIOS" is intended to also encompass Unified Extensible Firmware Interface (UEFI).

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by the illustrated components may instead be provided by components integrated into the one or more processor(s) as a system-on-a-chip (SOC) or the like.

Figure 4:
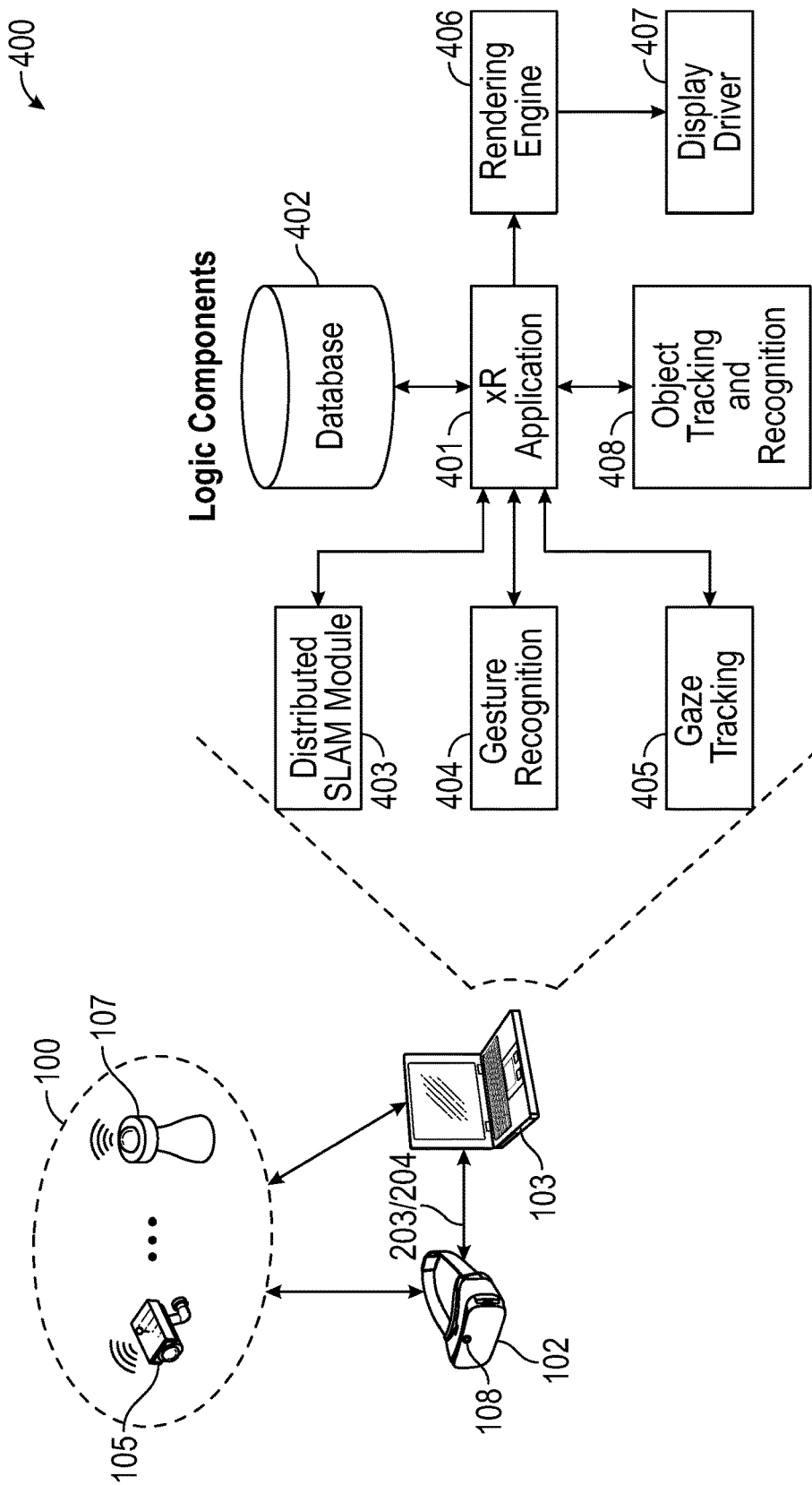
FIG. 4 illustrates an example of logic components of an xR application, according to some embodiments.

FIG. 4 illustrates logic components 400 of xR application 401. Generally, xR application 401 may include any xR application now existing or yet to be developed, including, but not limited to: entertainment, video games, robotics, healthcare, education and training, military uses, occupational safety, engineering, industrial or product design, collaboration applications, virtual meetings, etc.

Distributed SLAM module 403 uses positional tracking devices among camera(s) and sensor(s) 202 (e.g., in the IR spectrum) to construct a map of an unknown environment where an HMD is located, which simultaneously identifies where the HMD is located, its orientation, and/or pose.

Generally, distributed SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors among sensor(s) 202. And, in many embodiments, each different SLAM method may use a different positional tracking source or device. For example, wireless tracking may use a set of anchors or lighthouses 107A-B that are placed around the perimeter of environment 100A and/or one or more totems 106 or tags 110 that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible (RGB), IR, or NIR range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100A.

An estimator, such as an Extended Kalman filter (EKF), may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100A may be obtained, at least in part, from cloud 104.

For example, HMD 102 may capture IR/NIR frames (e.g., from camera 108), perform image pre-processing operations, generate object detection of landmarks using feature extraction techniques, and send SLAM data (e.g., pixel values for each pixel in the ROI, along with IR/NIR frame data, coordinates of detected landmarks, etc.) to host IHS 103. Host IHS 103 may perform EKF operations for each detected landmark and it may calculate a Kalman Gain (G) for each landmark (L), which in turn indicates a confidence or probability of the landmark's measured location being accurate.

In some cases, the consumption of IHS 103's hardware resources (e.g., CPU, GPU, memory, etc.) during operation of a SLAM method may be dependent upon the order or dimension of a square covariance matrix of landmark data (or other features extracted from sensor data). Particularly, IHS hardware resource utilization may be dominated by $O(M^2)$, where M is the number of landmarks detected: if $M^*$ is smaller than M, then host hardware utilization is reduced by $(M^2-M^{*2})/M^2 \times 100\%$. For example, if there are 100 landmarks detected (M=100), but only 50 landmarks are used (M=50), the reduction in utilization may be of 75%.

In various embodiments, distributed SLAM module 403 may be configured to sort or rank detected landmarks by confidence, probability, or priority; generate a cutoff based upon a desired or expected amount of resource utilization reduction (e.g., compute load) using calibration data; and employ only a selected subset of all available landmarks (e.g., the $M^*$ highest-ranked of M landmarks to be used; $M^*<M$) to generate covariance matrices to be used by the SLAM method thereafter.

In some embodiments, calibration of number of landmarks versus average CPU load (or any other IHS hardware resource) may be performed for the space where the user is engaging in an xR experience, and a calibration curve may be stored in database 402. The calibration curve provides a baseline for the space and the HMD-Host combination; but it should be noted that the process is specific to an HMD, the host IHS being used, and their environment. Calibration may also be used to select an optimal number M of sorted landmarks to use in steady state as the maximum number of landmarks to compute (e.g., a user may set the maximum permitted CPU load for SLAM at 10%, which limits the number of landmarks to 50).

Distributed SLAM module 403 may receive and rank all detected landmarks detected by HMD 102A (and other HMDs 102B-C), for example, using EKF. Particularly, EKF may be used to estimate the current state of a system based on a previous state, current observations, and estimated noise or error. A state is defined as a 1×N vector, where N is the number of measurements in a state. The primary relationship for an EKF defines a state transition as:

(New State)=(Old State)+$G$((Current Observation)−(Old State))

where G is known as the Kalman Gain. The value of G is based on average noise and/or measurement error over time, and it determines how much the current observation can be trusted.

The system state in an EKF for SLAM may be a 1×(6+3N) vector, where N is the number of landmarks. In that case, there may be 3 coordinates (e.g., x, y, z) for each landmark, and 6 coordinates (e.g., x, y, z, pitch, roll, yaw) for the user. Landmarks may be any static points in space that can be re-observed at a later state to determine how the system changed (a good landmark is easily identifiable and does not move, such as a wall, window, power outlet, etc.).

In various implementations, a matrix or table of size $(6+3N)^2$ stores the covariance between every pair of state measurements, and may be used when determining the Kalman Gain for a given landmark. The Kalman Gain may be used to determine how much to change every other state measurement based on the re-observed location of a single landmark: a greater Kalman Gain means that the landmark's new position may be trusted and used to update the system's state. Conversely, a Kalman Gain of zero means the position cannot be at all trusted and therefore the landmark should be ignored.

The use of EKF by distributed SLAM module 403 may be divided into 3 parts. The first part updates the current state from user movement. Motion may be described by the IMU data on the HMD, and the user's position and every known landmark's position may be estimated and updated. The second part uses re-observed landmarks via laser scanner or object recognition to update current state (both user position and landmark positions) more accurately than using IMU data, calculates G for the re-observed landmark, and updates the system accordingly. As noted above, G may be a vector showing how much to update every state variable based on the landmark's new position. The third part adds newly-observed landmarks to the system's state. Adding new landmarks adds to the dimensionality of the system state and covariance matrix, such that the algorithm runs on the order of $O(N^2)$, where N is the number of used landmarks.

To rank the landmarks, distributed SLAM module 403 may create a list of landmarks indices, sort the landmark indices by the Kalman Gain of corresponding landmarks, and produce a ranked or sorted list of all detected landmarks. Distributed SLAM module 403 may then a subset of landmarks for a corresponding target hardware resource utilization from the ranked list, and IHS 103 produces an xR environment displayed by HMD 102 based on SLAM processing using only the selected subset of landmarks.

Gesture recognition module 404 may also use one or more cameras or optical sensors 202 that enable user 101 to use their actual hands for interaction with virtual objects (VOs) rendered by display 205 within HMD 102. For example, gesture recognition module 404 may be configured to implement hand tracking and gesture recognition in a 3-D space via a user-facing 2-D camera. In some cases, gesture recognition module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Generally, gesture detection begins when video frame data (e.g., a video or depth-video stream) is received at host IHS 103 from gesture or RGB camera 108 of HMD 102. In some implementations, video data may have already been processed, to some degree, by processor 201 of HMD 102. Then, the video data is further processed to control aspects of xR application 401, by identifying various gestures and sequences that constitute user input.

At least a portion of the user's body may be identified in the video frame data obtained using gesture or RGB camera 108. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a geometric model of user 101. If a suitable fit is achieved, then pixels in that section may be recognized as those of user 101.

Gesture recognition module 404 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond.

For example, machine-learning may be used to assign each pixel a body-part index and/or body-part probability distribution. Such a machine-learning method may analyze a user with reference to information learned from a previously trained collection of known gestures and/or poses stored in a calibration database. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger).

In some embodiments, each joint may be assigned a number of parameters, such as, for example, Cartesian coordinates specifying joint position, angles specifying joint rotation, and other parameters specifying a conformation of the corresponding body part (e.g., hand open, hand closed, etc.). Skeletal-fitting algorithms may use the depth data in combination with other information, such as color-image data and/or kinetic data indicating how one locus of pixels moves with respect to another. Moreover, a virtual skeleton may be fit to each of a sequence of frames of depth video. By analyzing positional change in the various skeletal joints and/or segments, certain corresponding movements that indicate predetermined gestures, actions, or behavior patterns of user 101 may be identified.

Examples of one and two-handed gestures that may be recognized or tracked by gesture recognition module 404 include, but are not limited to: gestures for selecting and deselecting VOs, gestures for manipulating selected VOs (e.g., rotation and/or translation following the user's hand direction, position, and/or location), gestures for performing menu operations such as opening, closing, and/or repositioning (again, with menu rotation and/or translation following the user's hand), and gestures for manipulating applications, windows, or workspaces (e.g., using downward or upward swiping hand motion), among many others.

As used, herein, the term "minimize" or "minimizing" refers to the act of removing a window, object, application, or workspace from a main display area, collapsing it into an icon, caption, or placeholder. Conversely, the term "maximize" or "maximizing" refers to the act of displaying or expanding a window, object, application, or workspace to fill a main display area, for example, in response to user's selection of a corresponding icon, caption, or placeholder.

In other embodiments, the use of a virtual skeleton may not be necessary. For example, in other implementations, raw point-cloud data may be sent directly to a feature extraction routine within a gesture recognition module.

Gaze tracking module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, gaze tracking module 405 may be configured to identify a direction, extent, and/or speed of movement of the user's eyes in real-time, during execution of an xR application (e.g., a gaze vector). In addition, gaze tracking module 405 may be configured to calculate a region-of-interest of configurable size or shape (e.g., circular, rectangular, etc.), based in part upon the gaze vector.

In various implementations, gaze tracking module 405 may use, among camera(s) and/or sensor(s) 202, NIR light sources to produce glints on the surface of the cornea of the user's eye, and then it may capture images of the eye region using an inward-facing camera. Gaze tracking module 405 may estimate the user's gaze from the relative movement between the pupil center and glint positions. Particularly, an eye and/or gaze tracking algorithm may perform corneal reflection-based calculations that use MR illumination to estimate the gaze direction or the point of gaze using polynomial functions, or a geometrical model of the human eye.

To perform gaze estimation, gaze tracking module 405 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, gaze tracking module 405 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, gaze tracking module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, in various embodiments, gaze tracking module 405 may produce collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, gaze tracking module 405 may be configured to follow the user's gaze direction for natural exploration of a visual scene by capturing the user's visual perspective. Moreover, gaze tracking module 405 may also be configured to estimate user gaze and blink-state for interacting with the xR environment; several types of eye movements and gestures, such as saccades, smooth pursuit and nod-roll may be used. For example, gaze tracking module 405 may be configured to use gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

Rendering engine 406 may include any engine (e.g., UNITY, UNREAL, AUTODESK, etc.) configured to render an xR model displayed by HMD 102 from user 101's unique point-of-view based upon the user's coordinate location (e.g., from distributed SLAM module 403), the user's pose (e.g., IMU), and/or the user's gaze (e.g., from gaze tracking module 405). Display driver 407 is coupled to rendering engine 406 and configured to convert rendered video frames to a display format that HMD 102 can reproduce before the user's eyes.

Object tracking and recognition module 408 may implement any object identification or detection technique based on visual images, including, but not limited to: edge detection, corner detection, blob detection, ridge detection, or the like. In some cases, object tracking and recognition module 408 may operate with distributed SLAM module 403 to track the position or movement of objects using landmarks or the like.

Database 402 may include if/then rules with real-world objects and their location, orientation, and/or movement (e.g., angle(s), direction(s), trajector(ies), speed(s), etc.). In some cases, an if/then rule catalog may be filtered based upon the presence or identification of a master object and/or other surrounding, secondary objects in the user's FOV. Database 402 may include different if/then rule catalogs based upon the identity of an authenticated user, for example, as part of a profile. Additionally, or alternatively, if/then rules may be based upon historic continuous usage.

In some cases, database 402 may also include a list of gesture candidates that can be recognized or tracked by GRT module 404. Each gesture candidate may include a set of parameters that, once identified in a given set of image frames, enable recognition of a presently performed gesture.

Distributed SLAM

In various embodiments, systems and methods may take the form of server-client streaming with different transport layer mechanisms, such as Real-time Transport Protocol (RTP) over User Datagram Protocol (UDP)/Transmission Control Protocol (TCP), or the like. In some implementations, a service may be provided on IHS 103A to: run SLAM on configured ROIs for two or more HMDs 102A-C; receive ROI frames; and calculate landmark information. The service may also: receive absolute pose information related to the other HMDs, from their respective other IHSs; resolve absolute pose coordinates using camera transform matrix on landmarks received; construct a list of landmarks "observed" by all HMDs; and feed the list into the SLAM Application Programming Interface (API) of rendering engine 406.

As such, distributed SLAM module 403 of IHS 103A may not only receive and process SLAM data from that IHS's own HMD 102A, but it may also receive SLAM data from other HMDs 102B/C. Rendering engine 406 of IHS 103A may render an updated world space camera view for HMD 102A that is built using ROIs/landmarks found by two or more HMD's IR/NIR camera(s) and/or sensors.

In a first illustrative, non-limiting embodiment, a method may enable any given one of IHSs 103A-C to construct a map for entire space 100A using its own partial map obtained through HMD 102A, and also from HMD 102B and/or 102C. During an initial setup procedure, ROIs and capabilities may be established through mesh negotiation. In some cases, the size and position of each HMD's ROI—as a selected subset of pixels in a given frame—may be computed using conventional image processing methods. Each particular HMD 102A-C covers a respective one or more ROIs 111A-C, regardless of FOV (even assuming 360-degree SLAM).

Each IHS may compute landmarks for ROIs from all HMDs that the IHS is in direct communications with. Moreover, each IHS may get ROI landmark information obtained through other HMDs from their respective IHSs through IHS-to-IHS communications. Then, the current IHS may, on a per-HMD basis, apply a corresponding transform matrix to transform landmarks from one ROI Point-of-View (POV) to the current HMD POV based on each HMD absolute and/or the current HMD's pose. For example, landmarks from HMDs 102B/C may be rotated, moved up/down, etc. when moved from one user's view to match the view of HMD 102A.

The current IHS (e.g., IHS 103A) may, on a per-HMD basis, resolve overlapping landmarks across ROIs that have intersections 112, including occlusion, etc. For example, if a first HMD detects a landmark that is naturally occluded by another object, from the perspective of a second HMD, the occluded landmark may nonetheless be used to render a map for the second HMD, once SLAM data related to the occluded landmark is obtained from the first HMD and transformed into the second HMD's coordinate system. This results in a list of landmarks, corrected for resolved pose, with observed EKFs and relative distances from each user. This data is available to the current IHS for every HMD with which the IHS is in direct communications. The current IHS communicates an HMD map to each HMD via an instance of render engine 406 for that HMD (e.g., IHS 103 may be running multiple render engines, or a single render engine with multi-views).

In a second illustrative, non-limiting embodiment, a method may enable adaptation of ROIs across HMDs according to IHS compute loading. For example, if there are three IHSs of equal processing capabilities connected to one HMD each, and having 33% ROI coverage each, and if one of the IHSs gets overloaded (e.g., due to an OS update or any other process outside of xR application 401), the method may gracefully adapt to that IHS being able to provide only 11% ROI coverage (rather that losing tracking entirely for that ROI).

For example, the affected IHS may reduce its frame rate of compute for SLAM by a selected factor. In the previous example, a factor of 3 would effectively make the 33% ROI assigned to the IHS to be less dynamically updated (e.g., higher latency, less accurate, etc.). Additionally, or alternatively, the affected IHS may reduce its SLAM processing to 11% ROIs, and it may send to other IHSs a burst request to 44.5% each, for example.

When a new IHS enters space 100A during the xR session, a method may provide overall compute load reduction on existing IHSs. In some cases, HMD tracking information may be used to request a subset of ROIs from other HMDs which are predictively in line of tracking motion of a current HMD, for example, using motion vectors associated with the current HMD. As such, these embodiments may speed up the compute load per IHS and also the overall SLAM initial localization, steady-state tracking, and re-localization.

As used herein, the terms "transformation matrix" or "transform matrix" refer to matrices that determine how objects move around in space. For example, in some cases a transform matrix may be a 4×4 matrix that defines a transformation when applied to objects: translation, rotation and scaling. Translating an object moves it in space, rotating turns an object around its center, and scaling changes the size of an object. To apply a transform to a 3D object, such as a VO, every vertex in the 3D object may be multiplied by the transformation matrix.

When rendering engine 406 is operating, it needs to know where to place the "view camera" (i.e., the point of view for the render) in a given scene, which is done using a view matrix. For example, in some cases a view matrix may be a 4×4 matrix that contains information about the position and orientation of a viewing camera. Every vertex in the scene or frame may be multiplied the view matrix and the scene is rendered by HMD 102 (although the view matrix says how everything else in the scene should change to reflect the point of view of the camera, the camera itself does not move).

The inverse of the view matrix is referred to as the camera transform matrix, which describes how camera 108 itself moves around a scene or frame. That is, the camera transform matrix provides the position and rotation of camera 108.

To illustrate the distinction between a transform matrix and a view matrix, consider a scene that starts with camera 108 looking directly at a chair that is positioned in front of it. The user then turns the camera 45 degrees to the right (a). In this case the camera transform matrix would be a rotation matrix that indicates a 45-degree rotation to the right. The view matrix, however, would be a rotation matrix that indicates 45-degree rotation to the left around the camera's position. In another scene, if the user turns to the left and walks forward, the camera transform matrix would be a rotation matrix to the left followed by a translation matrix forward, which indicates how the user moved in the frame.

For example, if the user looks to the right (and HMD 102 turns right), the camera transform matrix obtained from SLAM sensor data may include a rotation to the right. If the user looks to the left (and HMD 102 turns left), the camera transform matrix obtained from SLAM sensor data may include a rotation to the left. If the user looks up (and HMD 102 turns upward), the camera transform matrix obtained from SLAM sensor data may include a rotation upward. And if the user looks down (and HMD 102 turns downward), the camera transform matrix obtained from SLAM sensor data may include a rotation downward. More generally, rotations around any axis may be performed by taking a rotation around the x axis, followed by a rotation around the y axis, and followed by a rotation around the z axis—such that any spatial rotation can be decomposed into a combination of principal rotations. Moreover, if HMD 102 moves forward, backward, or sideways, the camera transform matrix obtained from SLAM sensor data also reflects the resulting translation.

The term "world space," for xR application 401, refers to a coordinate system that defines where everything is located inside the application. Every object handled by xR application 401 may be given an X, Y and Z coordinate relative to an origin. Once calibrated, HMD sensors can transform their sensor data into world space coordinates. Then, when transform matrices are applied to 3D objects, the objects are moved around in world space. For instance, world space coordinates may be used by xR application 401 to overlay virtual hands directly on-top of the user's real hands.

Figure 5:
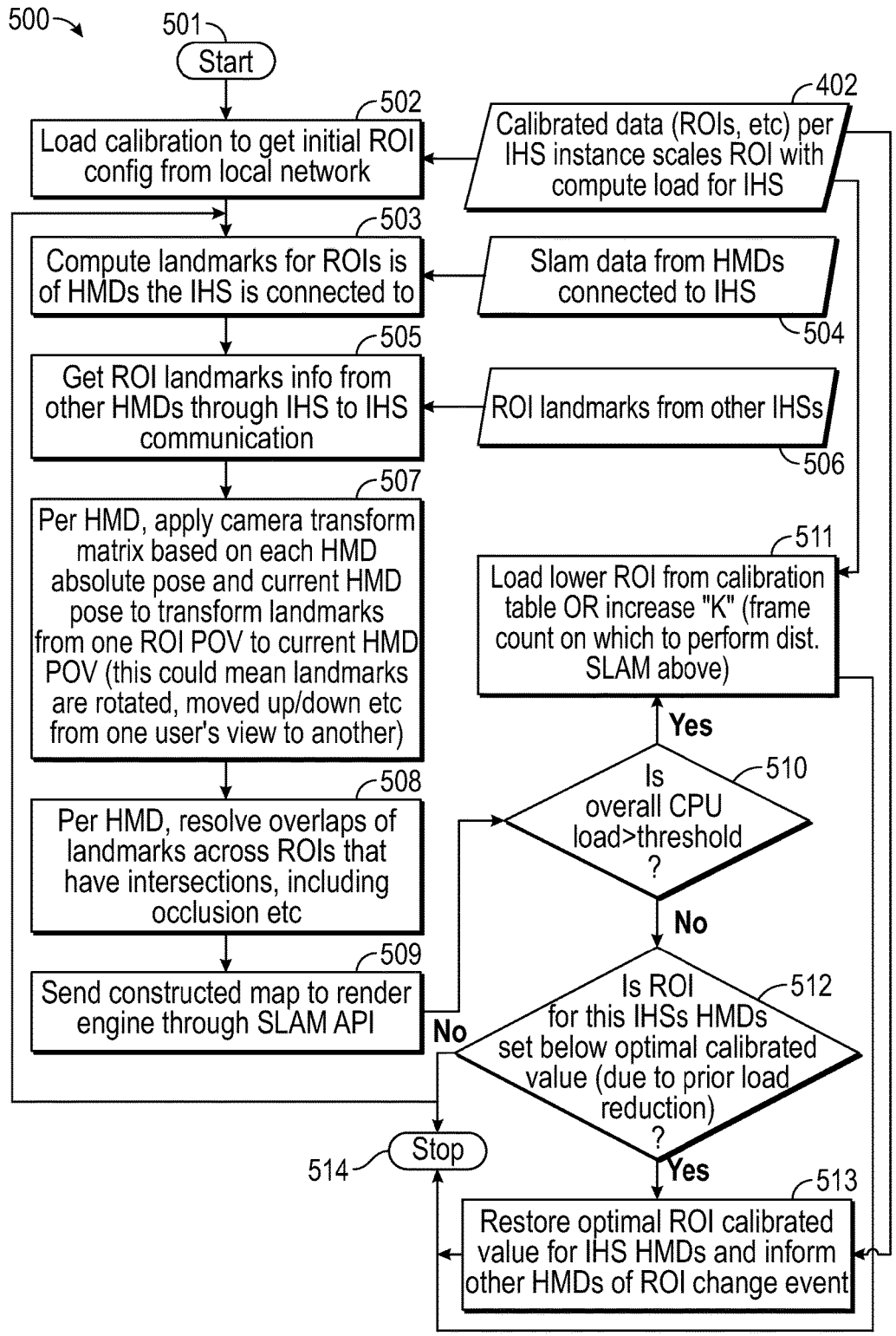
FIG. 5 illustrates an example of a method for distributed Simultaneous Localization and Mapping (SLAM), according to some embodiments.

FIG. 5 illustrates an example of method 500 for distributed SLAM. In some embodiments, method 500 may be performed by xR application 401 in cooperation with distributed SLAM module 403, under execution by an instance of IHS 103. During execution of xR application 401, HMD 102 transmits SLAM sensor data, eye-gaze tracking (EGT) sensor data, gesture recognition and tracking (GRT) data, and inter-process (IPC) communication data to IHS 103 via control interface 203. IHS 103 transmits encoded packetized rendered content (e.g., audio-video) to HMD 102 via video interface 204. As part of this process, distributed SLAM module 403 may perform one or more SLAM operations based on the SLAM data, including one or more distributed SLAM operations of method 500.

Particularly, method 500 begins at block 501. At block 502, method 500 loads calibration information to get initial ROI configuration for each HMD, for example, from database 402; which may contain calibrated data (e.g., ROIs, etc.) for the instant IHS instance that scales the size (e.g., in x-y pixels) and number of ROIs (e.g., one, two, etc.) in response to a present IHS compute or utilization load (e.g., processor or memory utilization, as a percentage of a maximum safe operating condition). At block 503, method 500 receives SLAM data 504 from HMDs that it is in direct communications with, and computes landmarks for ROIs of all HMDs.

At block 505, method 500 gets ROI/landmarks 506 from other IHS instances in the same mesh network, for example, via direct IHS-to-IHS communications. As such, IHS 103 may also collect and process ROIs/landmarks from HMDs that are not in direct communications with IHS 103. At block 507, method 500 applies a camera transform matrix to SLAM data, on a per-HMD basis, based upon each HMD absolute pose and/or the current HMD's pose, to transform landmarks from a given HMD's ROI POV to a current HMD's ROI POV, in a given coordinate system (e.g., the same as the current HMD's).

At block 508, method 500 resolves landmark overlap(s), on a per-HMD basis, across ROIs that have ROI intersections 112, including occlusion events, etc. For example, when first SLAM data includes landmarks found within a first ROI observable by a first HMD, and second SLAM data includes other landmarks found within a second ROI observable by a second HMD, the operation of resolving two or more landmarks between the first ROI and the second ROI (e.g., separated by a threshold distance) may include comparing the Kalman Gains of the two landmarks, and selecting the landmark with highest Kalman Gain.

At block 509, SLAM module 403 may send a map of space 100A, constructed using landmarks derived from SLAM data collected by multiple, co-located HMDs, to rendering engine 406 via a SLAM API.

At block 510, method 500 may determine whether the overall CPU load (e.g., processor(s) 301) is above a selected threshold value (e.g., 90% utilization). If so, block 511 may load a smaller ROI from calibration table 402, or it may increase a frame count (K) upon which distributed SLAM is performed). Otherwise, block 512 determines whether the ROI for the IHS's HMD is set below an optimal calibrated value (e.g., due to a reduction in block 511). If so, block 513 restores or increases the size of the ROI for the IHS's HMD's optimal calibrated value, and informs other HMDs and/or IHSs of the ROI change event. As noted above, method 500 may be repeated every K frames of SLAM data, and method 500 may use different K values to process frames originating from different HMDs. For example, if HMD 102B is closer in space to HMD 102A than HMD 102C, then IHS 103A (in direct communications with HMD 102A) may assign a smaller K value to the processing of IR/NIR frames obtained from HMD 102B, than from HMD 102C. Additionally, or alternatively, method 500 may end at block 514.

As such, systems and methods described herein may provide a serverless, multi-user xR EKF SLAM architecture that makes use of camera transform matrices (from absolute pose on EKF landmarks) to process SLAM data obtained by other (or all) co-located HMDs. These systems and methods may be adaptive in nature, and therefore can computationally scale; each host client may compute only within a selected utilization budget, which it has configured and communicated to its server, and can reduce the size of the ROI being computed in response to being loaded by other processes. Changes to SLAM APIs may provide ROI field-of-view (FOV) information back to IHS, and it may be configured to run SLAM only on the ROI, versus the entire 360 degrees.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
receive first Simultaneous Localization and Mapping (SLAM) data obtained by a first Head-Mounted Device (HMD) worn by a first user during execution of a virtual, augmented, or mixed reality (xR) application;
receive second SLAM data obtained by a second HMD worn by a second user co-located with the first user;
apply a transform matrix to the second SLAM data to produce transformed second SLAM data in a common coordinate system with respect to the first SLAM data;
render at least a partial map for display by the first HMD using a combination of landmarks identified in the first SLAM data and in the transformed second SLAM data; and
in response to a determination that the processor's utilization is above a threshold level, reduce an amount of second SLAM data relative to an amount of first SLAM data processed.

2. The IHS of claim 1, wherein the first SLAM data comprises landmark data found in a Region of Interest (ROI) within an infrared (IR) or near-IR (NIR) frame captured via a first camera mounted on the first HMD, and wherein the second SLAM data comprises landmark data found in another ROI within another IR or NIR frame captured via a second camera mounted on the second HMD.

3. The IHS of claim 1, wherein reducing the second amount of SLAM data comprises reducing a size of an ROI, per frame, received from the second HMD.

4. The IHS of claim 1, wherein reducing the second amount of SLAM data comprises reducing a number of frames, per unit time, received from the second HMD.

5. The IHS of claim 1, wherein using the combination of landmarks further comprises resolving two or more landmarks that overlap in space between a first ROI in the first SLAM data and a second ROI in the transformed second SLAM data.

6. The IHS of claim 1, wherein the program instructions, upon execution, further cause the IHS to select the second HMD among a plurality of other HMDs as being closest in space to the first HMD, at the given location.

7. The IHS of claim 1, wherein the program instructions, upon execution, further cause the IHS to select the second HMD among a plurality of other HMDs as being closest the first HMD's predicted trajectory.

8. The IHS of claim 1, wherein the program instructions, upon execution, further cause the IHS to request that another IHS coupled to the IHS:
receive at least a portion of the first SLAM data;
apply a transform matrix to the first SLAM data to produce transformed first SLAM data in a common coordinate system with respect to the second SLAM data; and
render at least another partial map for display by the second HMD using a combination of landmarks identified in the first transformed SLAM data and in the second SLAM data.

9. The IHS of claim 1, wherein the program instructions, upon execution by the processor, further cause the IHS to send a request to the second IHS in response to a determination that the second IHS has joined a mesh network.

10. The IHS of claim 9, wherein the second HMD is in direct communications with the second IHS and not with the first IHS, and wherein the first IHS is in direct communications with the second IHS.

11. A method, comprising:
- receiving, at an Information Handling System (IHS) coupled to a Head-Mounted Device (HMD) worn by a first user during execution of a virtual, augmented, or mixed reality (xR) application, first Simultaneous Localization and Mapping (SLAM) data obtained via a first camera mounted on the first HMD;
- receiving second SLAM data obtained by a second HMD worn by a second user co-located with the first user;
- applying a transform matrix to the second SLAM data to produce transformed second SLAM data in a common coordinate system with respect to the first SLAM data;
- rendering at least a partial map for display by the first HMD using a combination of landmarks identified in the first SLAM data and in the transformed second SLAM data; and
- in response to a determination that a processor's utilization is above a threshold level, reducing an amount of second SLAM data relative to an amount of first SLAM data processed.

12. The method of claim 11, wherein the first SLAM data comprises landmarks found within a first Region of Interest (ROI) observable by the first user, and wherein the second SLAM data comprises other landmarks found within a second ROI observable by another user.

13. The method of claim 12, wherein using the combination of landmarks further comprises resolving two or more landmarks that overlap in space between the first ROI and the second ROI.

14. The method of claim 13, wherein resolving the two or more landmarks further comprises comparing Kalman Gains of each of the two or more landmarks separated by a threshold distance, and selecting a landmark with highest Kalman Gain.

15. A hardware memory of a Head-Mounted Device (HMD) wearable by a user during execution of a virtual, augmented, or mixed reality (xR) application, the hardware memory having program instructions stored thereon that, upon execution by a processor, cause the HMD to:
- collect first Simultaneous Localization and Mapping (SLAM) data;
- transmit the first SLAM data to an Information Handling System (IHS) coupled to the HMD;
- display a rendering received from IHS, wherein the rendering is created, at least in part, using a combination of landmarks identified in the first SLAM data and in second SLAM data obtained by the IHS from a second HMD; and
- in response to a determination that the processor's utilization is above a threshold level, reduce an amount of second SLAM data relative to an amount of first SLAM data processed.

16. The hardware memory of claim 15, wherein the second HMD is in direct communication with the first IHS.

17. The hardware memory of claim 15, wherein the second HMD is in direct communications with a second IHS and not with the first IHS, and wherein the second IHS is in direct communication with the first IHS.

* * * * *